United States Patent Office 3,309,340
Patented Mar. 14, 1967

3,309,340
POLYPHENYLENE ETHER PURIFICATION PROCESS
Willem F. H. Borman, Dalton, Mass., assignor to General Electric Company, a corporation of New York
No Drawing. Filed Mar. 26, 1964, Ser. No. 355,094
4 Claims. (Cl. 260—47)

This invention relates to polyphenylene ether resins. More particularly, it relates to the purification of such polymers following a catalytic polymerization.

Polyphenylene ether resins are generally prepared by the oxidative polymerization of substituted phenols in the presence of a catalytic copper-amine complex as described in copending applications Ser. Nos. 212,127 and 212,128, filed July 24, 1963. Following such a polymerization, the polyphenylene ether resins contain amine catalyst residues. These residues tend to make the polymer corrosive and contribute to a darkening in color. Additionally, when the polymer is heated, cross-linking results. Further, the amine residues left from the catalytic polymerization often cause an unpleasant smell, particularly on heating the polymer, as during molding or extrusion operations.

The prior art method for reducing the catalytic residues left in the polyphenylene ether resins following polymerization, namely, repeated washings with dilute alcoholic acids and/or reprecipitation of the polymer from solution, will reduce the entrapped catalyst level considerably. However, by this method only the copper and halogen residues are reduced to satisfactory low levels. The amine catalyst residue may still remain as high as 0.5%, and is unaffected by repeated washing or reprecipitation, with either hot or cold solutions.

It has been found, in accordance with this invention, that the amine residue in a polyphenylene ether resin may be reduced to levels as low as 0.01% or less by treatment with an organic compound having a loosely bound halogen radical.

It is, therefore, one object of this invention to reduce the amine catalyst residue in a polyphenylene ether resin to a low level.

It is a further object of this invention to produce polyphenylene ether resins having improved heat stability and improved electrical properties.

Briefly, this invention involves polyphenylene ether resins formed of substituted or unsubstituted phenols. These resins, prepared pursuant to such methods as those disclosed in copending applications Ser. Nos. 212,127, and 212,128, filed July 24, 1963, that is, in an oxidative polymerization using a copper-amine complex as the catalyst, are dissolved in an organic compound having a loosely-bound halogen radical. The solution is refluxed for a period of time sufficient to bring the residual amine catalyst to the level which is desired. Following reflux, an organic precipitant is added to the solution to cause the polyphenylene oxide resin to precipitate. The resin is removed from the solution and may be, if desired, further washed with the non-solvent precipitant to remove loosely-bound amines and amine residues.

The polyphenylene ether resins which are susceptible of the purification just described are those formed from at least a majority of substituents having the formula

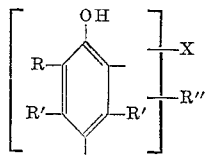

where X is selected from the group consisting of hydrogen, chlorine, bromine, and iodine; R is a monovalent substituent selected from the group consisting of hydrogen, hydrocarbon radicals, halohydrocarbon radicals having at least two carbon atoms between the halogen atoms and phenol nucleus, hydrocarbonoxy radicals, and halohydrocarbonoxy radicals having at least two carbon atoms between the halogen atoms and the phenol nucleus; and R' and R" are the same as R, and in addition, halogen radicals. Included among the resins having this generic formula are those formed from units such as 2,6-xylenol, 3-methoxyphenol, 2-butyl-3,5-diphenylphenol, 2-nonoxyphenol, and 2,3-dimethyl-4-chlorophenol. Such resins range from low molecular weight polymers having 10 to 15 units to high molecular weight polymers having film and fiber forming properties which have from 100 to 1500 or more units. Thus, the polymers to which this invention relates are those having the formula

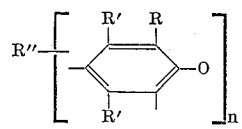

where R, R', and R" are as defined above and n is an integer and is at least 10.

A wide variety of compounds are useful as the solvent for removing the residual amine catalyst. However, each of these compounds has a loosely-bound halogen atom selected from the group consisting of chlorine, bromine, and iodine. Generally, these compounds are the substituted and unsubstituted hydrocarbon and oxyhydrocarbon compounds having the above-described halogen atom. Among these compounds may be mentioned aralkyl compounds such as benzylchloride, benzylbromide, benzyliodide, nitrated benzylchloride, nitrated benzylbromide, nitrated benzyliodide, nitrated chlorobenzene, nitrated bromobenzene, and nitrated iodobenzene; unsaturated hydrocarbon compounds such as allylchloride, allylbromide, and allyliodide; hydrocarbons such as methylchloride, methylbromide, methyliodide, chloroform, and tetrachloroethane; cycloaliphatic compounds such as chlorinated cyclohexane, brominated cyclohexane, iodinated cyclohexane, chlorinated cyclopentane, brominated cyclopentane, and iodinated cyclopentane; substituted halogenated alcohols such as chlorohydrin, bromohydrin, and iodohydrin; halogenated ketones such as 1-chloropropanone; halogenated ethers such as chloromethyl-methyl ether; acid halides such as acetylchloride; and alpha-haloacids such as monochloroacetic acid. Other compounds which have loosely-bound anionic acid groups, such as the nitro and sulfo groups, will also act to reduce the amine level in the polyphenylene ether resins. Such compounds include nitric and sulfuric esters, for example, dimethylsulfate and methylnitrate. Trinitroanisole is also effective. However, these compounds are not as effective as those having the loosely bound halogen radicals because they are less reactive with amines.

The halogenated compounds just mentioned may be used either alone, or in combination with each other or with inert diluents. These halides are representative only of the compounds which may be used to reduce the amine level in the polyphenylene ether resin and the list should not be considered as exhaustive. Among the inert diluents which may be used are water, alcohols, both aliphatic and aromatic, aliphatic and aromatic hydrocarbons and other commonly used solvents.

The treatment of the resin may be accomplished in a solvent solution containing from 1 to 100% of the halogenated compound. It is apparent that as the percentage of the halogenated compound decreases, the rate at which the amine is removed from the resin is correspondingly decreased. The preferred range of the mentioned halides is from 10 to 100%. A preferred amount of the halogenated compound is from 0.5 to 5.0 gm.-moles of the halide to 100 gm. of the polyphenylene ether resin. The actual solution utilized in purifying the resin should be about a 5-20% solution, a 10% solution being preferred, in the combined inert diluent and halide to provide a solution which will effect the facile removal of the residual amine.

The reagents mentioned above have a boiling point which is sufficiently high to allow removal of the amine at reflux. The temperature required to remove the amine at reflux is at least 100° C. and preferably at least 150° C. The overall solution must therefore have a boiling point of at least 100° C., unless the reaction is performed under pressure.

At least a part of the amine catalyst is chemically attached to the resin, rather than physically absorbed, as demonstrated by the fact that even repeated washings and precipitations do not reduce the residual content below a given level. Additionally, the amount of amine catalyst which remains in the polymer is generally higher when using a secondary amine catalyst as described in copending application Ser. No. 212,127, filed July 24, 1963, which results in the formation of a bound tertiary amine, than when using a tertiary amine as described in Ser. No. 212,128, filed July 24, 1963, which forms a quaternary amine. While the point in the polymer resin at which the amine is attached is not known with complete certainty, it appears most likely that it is bound to a diphenoquinone which is incorporated in the resin molecule. This is to be expected as the quinoid structure yields an active point of attack for amine. However, if the amine is attached at another site on the polymer chain, the result will still be a tertiary or quaternary amine, depending upon whether the complexing amine in the catalyst is secondary or tertiary.

Assuming that the residual nitrogen is present in the form of a tertiary amine, the following series of equations, where P represents the polyphenylene ether resin structure, indicates the course of the reaction with the halogenated hydrocarbons or oxyhydrocarbons. Benzylchloride is used as representative of the halide compounds used in the process of this invention.

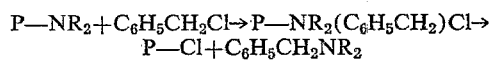

Thus, the halide first leads to a quaternization of the amine, followed by a thermal decomposition at the reflux temperature with the resultant formation of a free tertiary amine. The halide radical from the hydrocarbon or oxyhydrocarbon remains on the polymer chain. However, the difficulties encountered with a halogenated polymer are not the same as those noted with the retained amine. The halogenated hydrocarbon or oxyhydrocarbon remaining in the solution may further react with the tertiary amine to yield a quaternary ammonium halide. The effect of the retained halide radical is negligible.

The residual nitrogen, of course, may be present as a quaternary ammonium compound. In such a case, thermal decomposition of the onium will result at reflux temperatures, followed by reaction of the liberated tertiary amine with the hydrocarbon or oxyhydrocarbon halide, which thus prevents the formation of an equilibrium which would prevent complete removal of the nitrogen from the polymer.

The following are examples of the removal of residual amine catalysts from polyphenylene ether resins. These examples are illustrative only and should not be considered as limiting in any way the full scope of the invention as covered by the appended claims.

*Example 1*

Poly-(2,6-dimethyl-1,4-phenylene oxide) was prepared by the catalytic oxidation of 2,6-xylenol in a toluene solution in the presence of N,N,N',N'-tetramethyl-1,3-butanediamine substantially in a manner such as those disclosed in copending application Ser. No. 212,127, filed July 24, 1963. The product, which had a residual amine content of 0.75%, was split into five aliquots. The first aliquot was refluxed in toluene for about 3 hours. The second aliquot was refluxed in chlorobenzene for about 3 hours and the third in benzylalcohol for about 3 hours. Following reflux of these three aliquots the polymer was precipitated and washed with methanol. None of the aliquots exhibited a residual amine content of less than 0.2% following the reflux treatment. The fourth aliquot was dissolved in benzylchloride to give a 10% solution. Samples were removed from the solution periodically, and the residual amine content measured. The results obtained are presented in the following table.

| Reflux time in benzyl-chloride, hr. | Residual amine content, percent |
|---|---|
| 1.5 | 0.054 |
| 2.5 | 0.024 |
| 3.5 | 0.012 |

A fifth aliquot of the polymer described in this example was dissolved in tetrachloroethane and refluxed for 13 hours. While the results were not as striking as those realized with benzylchloride, the residual amine content of the resin was reduced significantly. A sample tested following the reflux period showed a residual amine content of 0.13%.

*Example 2*

A second poly-(2,6-dimethyl-1,4-phenylene oxide) was prepared, this time in the presence of diethylamine. Repeated washings and reprecipitations of this polymer from boiling solutions in the presence of various inert solvents such as toluene and benzylalcohol failed to produce polymers having residual amine contents of less than 0.47%. A separate portion of the polymer (25 gm.) was dissolved in 500 ml. of benzylchloride and refluxed for an extended period of time. Samples were periodically withdrawn and the residual amine content measured with the following results.

| Reflux time in benzyl-chloride, hr. | Residual amine content, percent |
|---|---|
| 0 | .87 |
| 0.5 | .20 |
| 1.0 | .11 |
| 2.0 | .05 |
| 4.0 | .03 |
| 7.5 | .02 |

The intrinsic viscosity of this polymer was also measured before and after treatment in the benezylchloride to show that the halide compound reflux has little effect on the basic polymer structure. The intrinsic viscosity, prior to reflux, was 0.42 dl./g. in chloroform at 30° C., while after the treatment it was 0.39 under the same conditions.

*Example 3*

A 50 gm. portion of poly-(2,6-dimethyl-1,4-phenylene oxide), prepared in the presence of morpholine, was dissolved in 500 ml. of benzylchloride. The solution was boiled under reflux for an extended period of time, and samples periodically removed to measure the residual amine content. The following results were obtained:

| Reflux time in benzyl-chloride, hr. | Residual amine content, percent |
|---|---|
| 0 | 1.78 |
| 1.5 | 0.19 |
| 5 | 0.03 |
| 8 | 0.01 |

As previously mentioned, the effect of reflux with the halohydrocarbon or halooxyhydrocarbon is essentially only the removal of the residual amine catalyst. The effect on the polymer structure, per se, is negligible as evident by the very slight change in intrinsic viscosity in Example 2. Thus, the result of the treatment is the formation, not of a new polymer, but only of a purified form of the particular polyphenylene ether resin.

These purified resins have several advantages over the amine-containing polyphenylene ethers of the prior art. For example, phenolic products are known to form dark condensation products when heated in the presence of amines. Thus, the removal of the amines, in accordance with the present invention, will improve the heat stability of the polyphenylene ether resins. Further, as amines tend to combine with moisture and form ionized products which lower the specific resistivity of the material, removal of the residual amine catalyst results in an improvement in the ultimate electrical properties of the polymer.

While specific embodiments of the invention have been shown and described, the invention should not be limited to these particular methods. It is intended, therefore, by the appended claims, to cover all modifications within the spirit and scope of this invention.

What is claimed is:

1. A method for purifying a polymer formed of recurring units of the formula

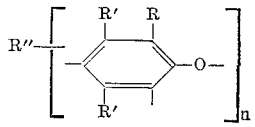

where R is a monovalent substituent selected from the group consisting of hydrogen, hydrocarbon radicals, and halohydrocarbon radicals having at least two carbon atoms between the halogen atoms and phenol nucleus, hydrocarbonoxy radicals, and halohydrocarbonoxy radicals having at least two carbon atoms between the halogen atoms and phenol nuclus; R' and R" are the same as R and, in addition, halogen radicals; and $n$ is an integer and is at least 10; said polymer having having been polymerized in an oxidative polymerization with a copper-amine catalyst, comprising dissolving the polymer in a compound selected from the group consisting of substituted and unsubstituted hydrocarbons and substituted and unsubstituted oxygenated hydrocarbons each having a loosely-bound radical selected from the group consisting of chlorine, bromine, and iodine, heating the solution to reflux for a time sufficient to lower the amine content of the polymer to a desired level, adding a percipitant, and separating the precipitated polymer from the solution.

2. The process of claim 1 wherein the polymer is formed from units having the formula

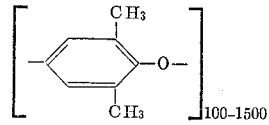

and the solvent is benzylchloride.

3. The process of claim 1 wherein the polymer contains a majority units having the formula

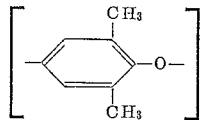

and the solvent is benzylchloride.

4. The process of claim 1 wherein the polymer is formed from 2,6-xylenol units and the solvent is tetrachloroethane.

References Cited by the Examiner

UNITED STATES PATENTS

| | | | |
|---|---|---|---|
| 3,228,910 | 1/1966 | Stamatoff | 260—47 |
| 3,234,183 | 2/1966 | Hay | 260—47 |
| 3,236,807 | 2/1966 | Stamatoff | 260—47 |

FOREIGN PATENTS

| | | |
|---|---|---|
| 613,739 | 12/1960 | Italy. |
| 930,993 | 7/1963 | Great Britain. |

WILLIAM H. SHORT, *Primary Examiner.*

J. C. MARTIN, M. GOLDSTEIN, *Assistant Examiners.*